United States Patent [19]

Frisch et al.

[11] Patent Number: 4,705,721

[45] Date of Patent: Nov. 10, 1987

[54] POLYURETHANE-BASED ADHESIVE COATING OR FILM, AND USE OF SAME IN LAMINATED GLASS PANES

[75] Inventors: Kurt C. Frisch, Grosse Ile; Daniel Klempner, Farmington Hills, both of Mich.; Helmer Rädisch; Gerhard Holzer, both of Aachen, Fed. Rep. of Germany

[73] Assignee: Saint-Gobain Vitrage, Courbevoie, France

[21] Appl. No.: 833,044

[22] Filed: Feb. 26, 1986

[30] Foreign Application Priority Data

Feb. 26, 1985 [FR] France ................................. 85 02740

[51] Int. Cl.[4] ........................ B32B 27/08; B32B 17/10; B32B 27/40
[52] U.S. Cl. ..................................... 428/349; 428/412; 428/423.1; 428/423.3; 428/423.7; 428/424.6; 428/424.8; 428/425.1; 428/425.6; 428/430; 528/66; 528/75
[58] Field of Search .................. 428/425.6, 212, 423.1, 428/423.3, 423.7, 424.8, 424.6, 412, 425.1, 430, 349; 156/331.7, 313; 528/66, 75

[56] References Cited

U.S. PATENT DOCUMENTS

| | | | |
|---|---|---|---|
| 4,010,311 | 3/1977 | Lewis et al. | 428/425.6 X |
| 4,041,208 | 8/1977 | Seeger et al. | 428/425.6 |
| 4,592,947 | 6/1986 | Hunter et al. | 428/212 |

*Primary Examiner*—Thomas J. Herbert
*Attorney, Agent, or Firm*—Oblon, Fisher, Spivak, McClelland, & Maier

[57] ABSTRACT

A transparent adhesive coating or film based on polyurethane. The coating or film comprises a polurethane formed from at least one aliphatic or cycloaliphatic diisocyanate, at least one polyol chosen from among the polyether diols, the polycaprolactone diols, the polycarbonate diols, and the polybutadiene diols, and at least one chain-lengthening agent which is a product of the reduction of dimeric acid to a diol. The adhesive coating or film is employed in laminated panes of glass and/or plastic material.

12 Claims, No Drawings

POLYURETHANE-BASED ADHESIVE COATING OR FILM, AND USE OF SAME IN LAMINATED GLASS PANES

BACKGROUND OF THE INVENTION

1. Field of the Invention

The invention relates to a polyurethane-based adhesive coating or film, and its use, in particular, as a transparent adhesive coating or film in the manufacture of laminated glass panes. More particularly, the invention relates to an adhesive coating or film based on a thermoplastic polyurethane which is resistant to moisture and is formed from moisture-insensitive polyols, aliphatic polyisocyanates, and a specific chain-lengthening agent.

2. Background of the Prior Art

Laminated glass panes are generally used, in particular, in motor vehicles or in architectural applications. Such panes are generally comprised of two sheets of glass and an intermediate layer comprised of a material having energy-absorbing properties, e.g., polyvinyl butyral. Recently a new type of laminated safety glass pane has been described in which the glass sheet disposed toward the interior of the vehicle is covered with a coating or sheet of a material having antilaceration and self-healing properties. The patent publications Fr. Pat. No. 2,308,606 and Eur. Pat. No. 0054491, e.g., describe such a laminated glass pane structure. The film with antilaceration and self-healing properties, which is a heat-setting polyurethane, is attached to the glass sheet by means of an adhesive layer. Fr. Pat. No. 2,398,606 describes the use of a thermoplastic polyurethane as the adhesive layer, in particular a polyurethane formed from a polyester diol. While such is generally satisfactory, it may be said that this type of polyurethane loses part of its adhesiveness with time, and the layer can easily become turbid in severe temperature and humidity conditions, e.g., under prolonged exposure to boiling water.

SUMMARY OF THE INVENTION

The inventive adhesive coating or film is a novel type based on polyurethane. It can be employed as an adhesive coating or film in the manufacture of laminated glass panes. It preserves its transparency and adhesion even under severe temperature and humidity conditions.

The adhesive coating or film according to the invention is based on a polyurethane formed from at least one moisture-insensitive diol having molecular weight greater than 300, at least one aliphatic or cycloaliphatic diisocyanate, and at least one chain-lengthening agent which is a product of the reduction of dimeric acid to diol form.

The invention also relates to the application of the said coating or film in laminated glass panes, particularly as a transparent adhesive coating or film interposed between glass and/or plastic sheets. The invention further relates to use of such a coating or film having antilaceration and self-healing properties with a monolithic or laminated support comprised of glass or plastic material.

DETAILED DESCRIPTION OF THE INVENTION

Candidates for the moisture-insensitive polyols which may be employed to make up the composition of the inventive polyurethane include polyether diols such as polyoxypropylene glycols, poly(1,4-oxybutylene) glycols, polycarbonate polyols, polybutadiene polyols, and polycaprolactone polyols, having molecular weight about 300 and about 3000.

Candidates for the aliphatic isocyanates to form the polyurethane coating or film include the following aliphatic isocyanates: 4,4'-methylenebis(cyclohexyl) diisocyanate, trans-1,4-cyclohexane diisocyanate, isophorone diisocyanate, hexamethylene diisocyanate, 1,3-xylylene diisocyanate, 1,4-xylylene diisocyanate, m- and p- tetramethylxylene diisocyanate, dimeryl diisocyanate, menthane diisocyanate, etc.

As chain-lengthening agents one may employ diols produced by reducing the carboxylic acid groups of dimeric acid to alcohol groups. Dimeric acid, having 36 C atoms, is a product of Diels-Alder dimerization of unsaturated fatty acids having 18 C atoms. It is further characterized by two or more lateral alkyl branches and at least one olefinic double bond. Such diols are generally called "dimerols", which is what they will be referred to as hereinafter.

To prepare the inventive adhesive composition, a reaction is carried out between the components, preferably in a solvent medium. The "prepolymer" method may be employed, whereby the polyol is reacted with an excess of the diisocyanate to form a prepolymer, which latter is an addition product comprising free isocyanate groups. Then the chain-lengthening agent of the dimerol type is added. Alternatively, one may employ the technique known as the single-stage method, whereby the polyol, the diisocyanate, and the chain-lengthening agent of the dimerol type are mixed together directly.

The solvent used for preparing the adhesive composition in solvent medium may be, e.g., dioxane, tetrahydrofuran, cellosolve acetate, dimethylformamide, xylene, toluene, methyl ethyl ketone, methyl isobutyl ketone, ethyl acetate, or a mixture of these solvents. One may also employ alcohols, such as isopropyl alcohol, to dissolve the polymers.

Heat and/or catalysts may be used to accelerate the polymerization reaction of the polyurethane. The catalyst used may be, e.g., an organotin (e.g., dibutyltin dilaurate, tributyltin oxide, or tin octoate), an organomercury catalyst, tertiary amines such as triethylene diamine.

For the fabrication of the adhesive coating or film according to the invention, one may employ film casting of a solution of polyurethane in a solvent or a mixture of solvents. Alternatively, one may fabricate the coating or film by extrusion.

The adhesive coating or film may be formed in situ on one of the elements to be bonded; e.g., in the case where the adhesive coating or film is employed to provide adhesion of the layer having antilaceration and self-healing properties to the support, the adhesive coating or film may be formed in situ on the monolithic or laminated rigid support, or, preferably, as described below, on the layer of plastic material having antilaceration and self-healing properties; and this forming may be carried out during a continuous fabrication process of a two-layer laminated sheet.

In this case, the two-layer laminated sheet may be fabricated as follows: First, a first layer is fabricated, which layer may either be the adhesive film according to the invention or else the sheet of self-healing plastic material formed, e.g., of a heat-setting polyurethane material. Then the second layer is formed on top of this first layer.

Alternatively, a heat-setting polyurethane sheet may be formed first, by film casting of the component mixture on a film-casting support. After polymerization of the monomers and formation of a heat-setting sheet of thickness which may vary between 0.1 and 0.8 mm, a solution of the polyurethane according to the invention is molded onto this first layer by film casting. Alternatively, one may proceed in the opposite manner, i.e., first forming the adhesive polyurethane film according to the invention.

The adhesive coating or film according to the invention may be used alone as the adhesive for bonding the layer of the plastic material having antilaceration and self-healing properties to the other elements of the laminated glass pane.

The adhesive coating or film according to the invention may also be used for fabricating other types of laminated glass panes, comprised of glass and/or plastic material.

Thus, the adhesive coating or film may be employed for fabricating a laminated glass pane comprised of plastic material. For example, the adhesive coating or film may be placed between two sheets or films of plastic material (e.g., polycarbonate, cellulose plastic, acrylic such as polymethyl methacrylate, polyvinyl chloride, polystyrene, polyethylene terephthalate, or polyurethane).

The coating or film according to the invention may also comprise additives, the purpose of which is generally to facilitate fabrication. Thus, the said coating or film may contain a coating agent such as a silicone resin or a fluoroalkyl ester.

To manufacture laminated glass panes employing the polyurethane coating or film according to the invention, the elements are bonded together with the use of pressure, e.g., by compressing the elements between the rolls of a calender; and by employing heat. Advantageously, one of the elements is precoated with the adhesive coating or film. The element thus coated may be (in favorable cases) the sheet of heat-setting material, for the case of the two-layer laminated sheet described.

The laminated glass pane obtained is clear, having excellent optical quality and excellent adhesion between the elements bonded by the adhesive coating or film according to the invention. These properties of transparency and adhesion are retained even under extreme conditions of temperature, moisture, and illumination, and in particular after immersion for 2 hr in boiling water.

The invention is illustrated by the following examples.

EXAMPLE 1

2551 g (7.97 equivalents) poly(1,4-oxybutylene) glycol having molecular weight 650 were mixed with 880 g (3.42 equivalents) dimerol. The mixture was dissolved in 150 g dioxane to form a 25% solution. 0.01 g dibutyltin dilaurate was added, after which 1569 g (11.96 equivalents) 4,4'-methylenebis(cyclohexyl) diisocyanate was added. This brought the NCO/OH molar ratio to 1.05. The mixture was heated under reflux to 100°–105° C. with agitation, under nitrogen atmosphere, until completion of the reaction (determined by zero content of isocyanate). After cooling to 50° C., the solution was diluted to 10% solid matter by addition of 150 g methyl ethyl ketone and 150 g tetrahydrofuran. The result was a very transparent solution characterized by a viscosity of 35 mPa-sec at 23° C. This solution was then applied to a flat glass support by film casting. The resulting film, after drying, had excellent optical quality and excellent adhesion to the glass. These properties were retained after immersion for 2 hr in boiling water.

For comparison, when a polyurethane was manufactured with the same components but using 1,4-butanediol in place of the dimerol-type chain-lengthening agent, immersion for 2 hr in boiling water caused the adhesive film to become turbid and to suffer degradation of its adhesion to the support.

This shows the advantage of employing a chain-lengthening agent of the dimerol type in manufacturing the polurethane.

EXAMPLE 2

The procedure was the same as in Example 1, except that the ratio of isocyanate to long-chain polyol employed was 1.6 instead of the 1.5 used in Example 1. Thus, 2407 g (7.52 equivalents) poly(1,4-oxybutylene) glycol having molecular weight 650, 1014 g (3.94 equivalents) dimerol, and 0.01 g dibutyltin dilaurate were dissolved in 150 g dioxane. After addition of 1759 g (12.04 equivalents) 4,4'-methylenebis(cyclohexyl) diisocyanate, the remaining procedure was as described in Example 1.

The 10% solid matter solution obtained after addition of 150 g methyl ethyl ketone and 150 g tetrahydrofuran was clear and had a viscosity of 30 mPa-sec at 23° C. After film-casting onto a glass support and drying, the polyurethane film had excellent optical quality and excellent adhesion. These properties were retained after immersion for 2 hr in boiling water.

EXAMPLE 3

The procedure was the same as in Example 1, except that the ratio of isocyanate to long-chain polyol employed was 1.8. Thus, the reaction mixture was comprised of 2163 g (6.76 equivalents) poly(1,4-oxybutylene) glycol, 1241 g (4.83 equivalents) dimerol, and 1596 g (12.17 equivalents) 4,4'-methylenebis(cyclohexyl) diisocyanate. The catalyst and the solvents were added as in the preceding Examples. The resulting solution had a viscosity of 40 mPa-sec at 23° C., and gave a clear film which resisted degradation when immersed 2 hr in boiling water.

EXAMPLE 4

The procedure was the same as in Example 2, except that the ratio of isocyanate to long-chain polyol employed was 2.0. Thus, 1963 g (6.13 equivalents) poly(1,4-oxybutylene) glycol and 1428 g (5.55 equivalents) dimerol were reacted with 1610 g (12.27 equivalents) 4,4'-methylenebis(cyclohexyl) diisocyanate. The resulting solution was clear and had a viscosity of 55 mPa-sec at 23° C.

A polyurethane film obtained by film casting onto a glass support had excellent optical quality and excellent adhesion. These properties were retained after immersion for 2 hr in boiling water.

EXAMPLE 5

The long-chain polyol employed in this example was a poly(caprolactone) glycol, having nominal molecular weight 1200. Dimerol was again used as the chain-lengthening agent. Thus, 2980 g (4.81 equivalents) dimerol were reacted with 1136 g (8.66 equivalents)

4,4'-methylenebis(cyclohexyl) diisocyanate. The amounts of solvents and catalyst were the same as in the preceding Examples. The viscosity of the clear solution obtained was 40 mPa-sec at 23° C. The film had excellent optical quality and excellent adhesion. These properties were retained after immersion for 2 hr in boiling water.

EXAMPLE 6

The procedure was the same as in Example 5, except that the ratio of isocyanate to long-chain polyol employed was 2.0 instead of the 1.8 used in Example 5. Thus, 2778 g (4.49 equivalents) poly(caprolactone) glycol having molecular weight 1200 was reacted with 1044 g (4.06 equivalents) dimerol and 1178 g (8.98 equivalents) 4,4'-methylenebis(cyclohexyl) diisocyanate. The solution obtained by the method described supra had a viscosity of 35 mPa-sec at 23° C. The film obtained had satisfactory properties even after being immersed 2 hr in boiling water.

EXAMPLE 7

In this Example, a poly(caprolactone) glycol based on 1,6-hexanediol and having nominal molecular weight 600 was used as the long-chain polyol. 2045 g (7.04 equivalents) of this polyol and 1293 g (5.03 equivalents) dimerol were reacted with 1667 g (12.71 equivalents) 4,4'-methylenebis(cyclohexyl) diisocyanate; the remainder of the procedure was the same as in the preceding Examples. The resulting solution was clear and had a viscosity of 30 mPa-sec at 23° C. After film-casting onto a glass support and drying, there resulted a transparent film which had excellent optical quality and excellent adhesion. These properties were retained after immersion for 2 hr in boiling water.

EXAMPLE 8

The procedure was the same as in Example 7, except that the ratio of isocyanate to long-chain polyol was taken to 2.0 instead of the 1.8 used in Example 7. Thus, 1850 g (6.37 equivalents) poly(1,6-hexamethylenecarbonate)glycol having molecular weight 600 and 1480 g (5.76 equivalents) dimerol were reacted with 1670 g (12.73 equivalents) 4,4'-methylenebis(cyclohexyl) diisocyanate. The solution obtained by the method described in the preceding Examples had a viscosity of 35 mpa-sec at 23° C. The film obtained had good transparency and good adhesion, even after being immersed 2 hr in boiling water.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transparent adhesive polyurethane-based layer for use in laminated panes, wherein the polyurethane is formed from at least one aliphatic or cycloaliphatic diisocyanate, at least one polyol selected from the group consisting of the polyether diols, the polycaprolactone diols, the polycarbonate diols, and the polybutadiene diols, and at least one chain-lengthening agent which is a product of the reduction of dimeric acid to diol form, said dimeric acid having 36 C atoms and produced by Diels-Alder-type dimerization of unsaturated fatty acids having 18 C atoms, said acid being further characterized by having two or more lateral alkyl branches and at least one olefinic double bond.

2. A transparent sheet of plastic material of high optical quality, employed in the manufacture of laminated glass panes and comprised of two layers, one of which layers is comprised of plastic material having antilaceration and self-healing properties, wherein the first layer is comprised of a heat-setting polyurethane material, and the other layer comprised of plastic material having adhesive properties; and wherein the layer of plastic material having adhesive properties is the adhesive layer according to claim 1.

3. A laminated glass pane comprising an adhesive layer according to claim 1 on one of its major surfaces.

4. A laminated glass pane according to claim 3, wherein the adhesive layer is disposed between two glass sheets.

5. A laminated glass pane according to claim 3, wherein the adhesive layer is disposed between two sheets, coatings, or films, of plastic material, which material is selected from the group consisting of polycarbonate, cellulose plastic, acrylic, polyvinyl chloride, polystyrene, polyethylene terephthalate, and polyurethane.

6. A laminated glass pane according to claim 3, wherein the adhesive layer is disposed between a glass sheet and a sheet comprised of plastic material.

7. A laminated glass pane according to claim 6, wherein said sheet of plastic material comprises heat-setting polurethane material having antilaceration and self-healing properties.

8. A transparent adhesive layer according to claim 1, wherein the polyol has a molecular weight between 300 and 3000.

9. A transparent adhesive layer according to claim 1, wherein the aliphatic diisocyanate is selected from the group consisting of 4,4'-cyclohexane diisocyanate, isophorone diisocyanate, hexamethylene diisocyanate, and dimeryl diisocyanate.

10. A transparent adhesive layer according to claim 9, wherein the diisocyanate is selected from the group consisting of trans-1,4-cyclohexane diisocyanate and 4,4'-methylenebis(cyclohexyl) diisocyanate.

11. A transparent adhesive layer according to claim 1, wherein the polyol is a polyether diol selected from the group consisting of the poly(1,4-oxybutylene)diols and the poly(oxypropylene)diols.

12. A transparent adhesive layer according to claim 11, wherein the polyol is poly(1,4-oxybutylene) glycol.

* * * * *